United States Patent
Nakaya et al.

(10) Patent No.: US 7,800,552 B2
(45) Date of Patent: Sep. 21, 2010

(54) ANTENNA APPARATUS FOR MULTIPLE INPUT MULTIPLE OUTPUT COMMUNICATION

(75) Inventors: Yuuta Nakaya, Kawasaki (JP); Ichirou Ida, Kawasaki (JP); Atsushi Honda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 278 days.

(21) Appl. No.: 11/471,304

(22) Filed: Jun. 20, 2006

(65) Prior Publication Data

US 2007/0205959 A1 Sep. 6, 2007

(30) Foreign Application Priority Data

Mar. 2, 2006 (JP) .............................. 2006-056972

(51) Int. Cl.
*H01Q 3/24* (2006.01)
*H01Q 1/38* (2006.01)
*H01Q 21/00* (2006.01)

(52) U.S. Cl. .............................. 343/876; 343/700 MS; 343/893

(58) Field of Classification Search .......... 343/700 MS, 343/893, 876, 900, 793, 797, 810–820, 846
See application file for complete search history.

(56) References Cited

U.S. PATENT DOCUMENTS

| | | | | |
|---|---|---|---|---|
| 6,801,790 | B2 * | 10/2004 | Rudrapatna | 455/562.1 |
| 7,292,201 | B2 * | 11/2007 | Nagaev et al. | 343/818 |
| 7,336,719 | B2 * | 2/2008 | Gore et al. | 375/267 |
| 2002/0175862 | A1 | 11/2002 | Hunter et al. | |
| 2003/0060178 | A1 | 3/2003 | Ghassemzadeh et al. | |
| 2003/0076269 | A1 | 4/2003 | Kuramoto | |
| 2003/0162519 | A1 | 8/2003 | Smith et al. | |
| 2004/0017320 | A1 | 1/2004 | Yuanzhu | |
| 2004/0028157 | A1 * | 2/2004 | Aoki et al. | 375/347 |
| 2004/0259555 | A1 * | 12/2004 | Rappaport et al. | 455/446 |
| 2006/0152413 | A1 * | 7/2006 | Uno et al. | 343/700 MS |

FOREIGN PATENT DOCUMENTS

| | | |
|---|---|---|
| EP | 1 587 338 | 10/2005 |
| EP | 1 596 469 | 11/2005 |
| GB | 2 414 365 | 11/2005 |
| JP | 5-145331 | 6/1993 |
| JP | 10154952 | 6/1998 |
| JP | 2002-330026 | 11/2002 |
| JP | 2003-133481 | 5/2003 |
| JP | 2003134013 | 5/2003 |
| JP | 2004-056281 | 2/2004 |
| JP | 2004-266367 | 9/2004 |

(Continued)

OTHER PUBLICATIONS

European Search Report dated Jun. 21, 2007, from the corresponding European Application.

(Continued)

*Primary Examiner*—Shih-Chao Chen
(74) *Attorney, Agent, or Firm*—Katten Muchin Rosenman LLP (57) ABSTRACT

At least two antennas are selected from a plurality of antennas which consist of at least two antennas having polarization characteristics or directivities different from one another, and which are arranged such that spatial fading correlations between the antennas are low, and a multiple input multiple output communication is conducted by using the selected antennas.

11 Claims, 5 Drawing Sheets

FOREIGN PATENT DOCUMENTS

| | | |
|---|---|---|
| JP | 2004289407 | 10/2004 |
| JP | 2005020301 | 1/2005 |
| JP | 2005167911 | 6/2005 |
| WO | 02/49153 | 6/2002 |
| WO | 03/034614 | 4/2003 |
| WO | 2005065122 | 7/2005 |

OTHER PUBLICATIONS

Andreas F. Molisch. "MIMO systems with antenna selection—an overview" Radio and Wireless Conference, Aug. 10, 2003, pp. 167-170.

Das N K et al. "An experiment on MIMO system having three orthogonal polarization diversity branches in multipath-rich environment" Vehicular Technology Conference, Sep. 2004, pp. 1528-1532.

Rothammel K. "Antennenbuch, 19.4.1.10. Die Kapazitiv Belastete Groundplane" 1991, pp. 345-346.

European Communication pursuant to Article 94(3) EPC dated Jun. 25, 2008, from the corresponding European Application.

European Communication pursuant to Article 94(3) EPC dated Jul. 24, 2009, from the corresponding European Application.

Ozgur Oyman, et al. "Tight Lower Bounds on the Ergodic Capacity of Rayleigh Fading MIMO Channels" IEEE Global Telecommunications Conference, vol. 2, Nov. 17, 2002, pp. 1172-1176.

Notice of Rejection Ground dated Jul. 6, 2010 for corresponding Japanese Application No.: 2006-056972.

* cited by examiner

ANTENNA APPARATUS FOR MULTIPLE INPUT MULTIPLE OUTPUT COMMUNICATION

BACKGROUND OF THE INVENTION

1. Field of the Invention

The present invention relates to a wireless communication system, and particularly to an antenna apparatus in a MIMO (Multiple Input Multiple Output) system, which conducts wireless communications using a plurality of antennas for transmitting and receiving.

2. Description of the Related Art

A received signal r in a wireless communication is given as a result of integrating the product of a directivity $G(\theta, \phi)$ of an antenna and a characteristic $H(\theta, \phi)$ of a propagation path, as shown in the equation below.

$$r = \int_0^\pi \int_{-\pi}^\pi G(\theta,\phi) H(\theta,\phi) d\phi d\theta \qquad (1)$$

In the above equation, $\theta$ and $\phi$ respectively represent an azimuth angle and an elevation angle in the receiving side. Generally, because $H(\theta, \phi)$ is a variable of natural phenomenon which a human can not control, and expresses an incoming wave distribution which is spatially polarized. Accordingly, it is desired that human controllable $G(\theta, \phi)$ is spatially uniform (nondirectional antenna) for improving a received power, however, it is not practicable to construct such an antenna.

As a result, a case occurs that a directivity of an antenna is null in the direction from which radio waves are coming. In this case, the received power is greatly reduced while received electric field density is high.

The Patent Document 1 below relates to an antenna apparatus comprising a plurality of antennas having different directivities for solving the above drawback. In this antenna apparatus, an output obtained from the directivity synthesis of four monopole antennas and an output of a patch antenna are compared, and the output with the better communication quality is selected.

Patent Document 1

Japanese Patent Application Publication No. 2004-266367

In recent years, as a technique of improving frequency utilization efficiency, a MIMO system has gathered interests in the field of a wireless communication, in which system communications are conducted by a transmitting side and a receiving side both of which have a plurality of antennas respectively. In the transmitting side in the MIMO system, a spatial multiplexing is conducted by simultaneously transmitting different information from the plurality of transmission antennas at the same frequency. In the receiving side, signals are received by the plurality of reception antennas, and information is extracted by demultiplexing the respective signals.

However, the above conventional antenna apparatus has the problems below.

In the MIMO communication, it is necessary that the respective antennas are arranged such that fading correlations between the antennas are sufficiently low in the receiving side because the spatially multiplexed signals are to be demultiplexed. When the plurality of antennas are arranged simply in an array, the volume of the antenna apparatus becomes greater. However, when the intervals of antennas are reduced for a smaller size of the antenna apparatus, the fading correlations become higher, and the characteristic deteriorates.

In the antenna apparatus of the Patent Document 1, four monopole antennas are recognized as one antenna having the first directivity, and a patch antenna is recognized as the other antenna having the second directivity in order to selectively use only one of these two antennas. Accordingly, the spatial multiplexing can not be conducted by the plurality of antennas, therefore, the antenna apparatus of the Patent Document 1 is not suitable for the MIMO communication.

SUMMARY OF THE INVENTION

It is an object of the present invention to provide an antennal apparatus for a MIMO communication which presents a high communication quality, and in which a plurality of antennas are efficiently arranged in a small volume.

The antenna apparatus for the MIMO communication according to the present invention comprises a plurality of antennas and a switch. These antennas consist of at least two antennas having polarization characteristics or directivities different from one another, and are arranged such that a spatial fading correlation is low between each other. The switch selects at least two antennas used for the MIMO communication from these antennas.

DESCRIPTION OF THE PREFERRED EMBODIMENT

Hereinbelow, the most preferred embodiment for implementing the present invention is explained in detail, by referring to the drawings.

Figure 1:
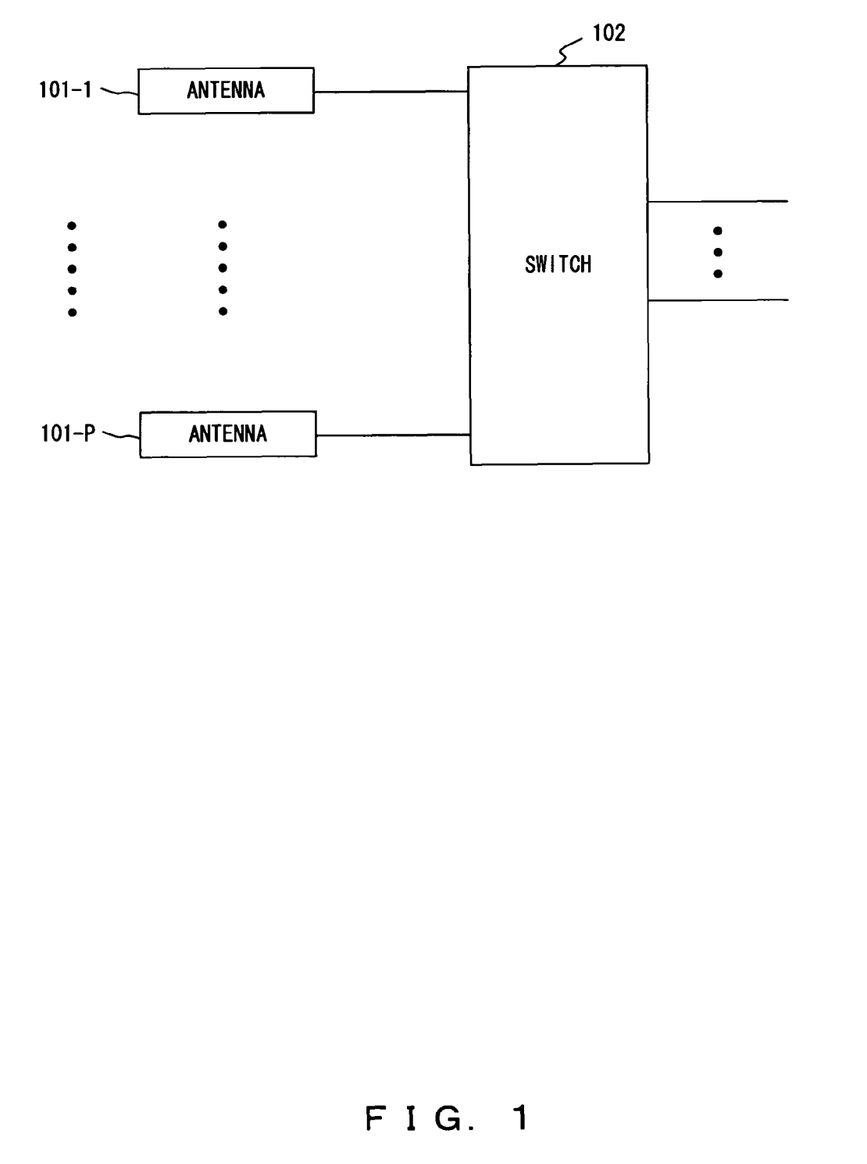
FIG. 1 shows a principle of an antenna apparatus according to the present invention.

FIG. 1 shows a principle of an antenna apparatus for a MIMO communication according to the present invention. The antenna apparatus for the MIMO communication comprises P number of antennas 101-1 through 101-P, and a switch 102.

The antennas 101-1 through 101-P consist of at least two antennas having polarization characteristics or directivities which are different from one another, and are arranged such that the spatial fading correlation is low between each other. The switch 102 selects at least two antennas used for the MIMO communication from the antennas 101-1 through 101-P. Then, the MIMO communication is conducted by using the selected antennas.

For example, in the antenna apparatus of FIG. 3 which will be described later, the antennas 101-1 through 101-P correspond to monopole antennas 301 through 304 and a radiation conductor 306 (two patch antennas), and the switch 102 corresponds to an RF switch 308.

Also, in the antenna apparatus of FIG. 4 which will be described later, the antennas 101-1 through 101-P correspond to monopole antennas 401 through 404 and the radiation conductor 306 (two patch antennas), and the switch 102 corresponds to the RF switch 308.

According to the present invention, it is possible that a plurality of antennas are included in a small volume by using at least two antennas having different polarization characteristics or directivities such as a monopole antenna and a patch antenna, for example.

Also, by selecting a combination of the antennas which is the most suitable for a communication from the plurality of antennas having different polarization characteristics or directivities, not only the quality of the MIMO communication but also the throughput of the MIMO system are improved.

Figure 2:
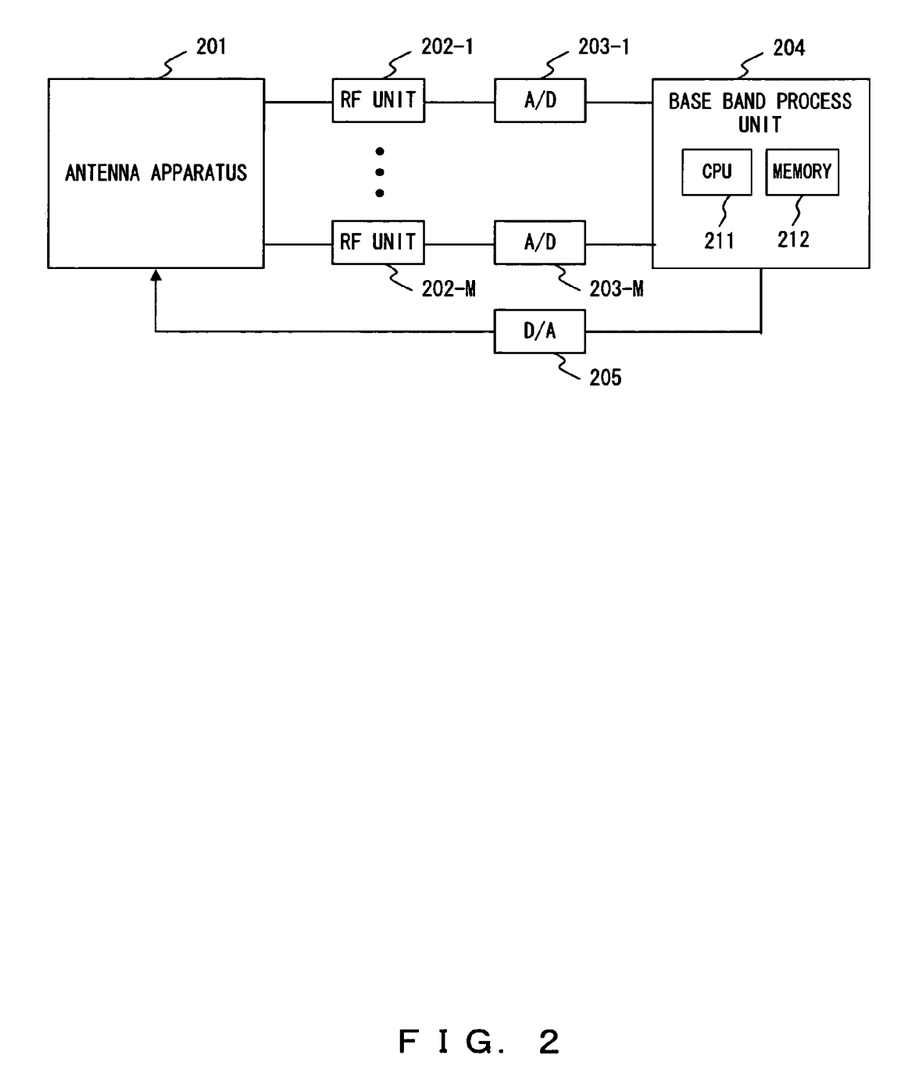
FIG. 2 shows a configuration of a MIMO communication apparatus.

FIG. 2 shows a configuration of the MIMO communication apparatus according to the present invention. This MIMO communication apparatus comprises an antenna apparatus 201, M number of radio frequency (RF) units 202-1 through 202-M, M number of analog/digital (A/D) converters 203-1 through 203-M, a base band process unit 204, and a digital/analog (D/A) converter 205. The base band process unit 204 comprises a CPU (Central Processing Unit) 211 and a memory 212.

The antenna apparatus 201 comprises at least M+1 number of antennas, and selects M number of antennas therefrom in order to connect them to the RF units 202-1 through 202-M. The RF-unit 202-$m$ ($m=1, \ldots, M$) mainly comprises a filter, a mixer, and an amplifier, and converts a base band signal into a high frequency signal when transmitting, and converts the high frequency signal into the base band signal when receiving. The RF unit 201-$m$ can comprise elements other than the above elements. The A/D converter 203-$m$ converts the received signal from the RF unit 202-$m$ into a digital signal. A base band process unit 204 performs a base band process by using the digital signal.

When selecting the antennas, the CPU 211 calculates a prescribed evaluation function by using the memory 212, and outputs an antenna selection signal to the D/A converter 205. The D/A converter 205 converts the antenna selection signal into an analog signal, and outputs the analog signal to the antenna apparatus 201. The antenna apparatus 201 selects M number of antennas in accordance with the antenna selection signal.

When the antenna apparatus 201 is controlled by means of digital signals, a digital/digital converter is used in place of the D/A converter 205.

Next, the configuration of the antenna apparatus 201 is explained. In a wireless communication, when the polarizations are different between two antennas, fading variations which are independent from each other occur. Also, it is known that even when the polarizations are the same, the correlation coefficient is reduced to equal to or less than 0.7 when the intervals between antennas are about half-wave length, and the fading correlation becomes lower, generally.

Accordingly, when a plurality of antennas having different polarization characteristics (or directivities) are prepared, and the antennas having the same characteristics are arranged with the intervals generally equal to the half-wave length, it is possible to realize the MIMO communication with lowered fading correlations. As these antennas, a linear antenna such as a monopole antenna or the like, and a micro strip antenna (a flat antenna) such as a patch antenna or the like can be employed.

Figure 3:
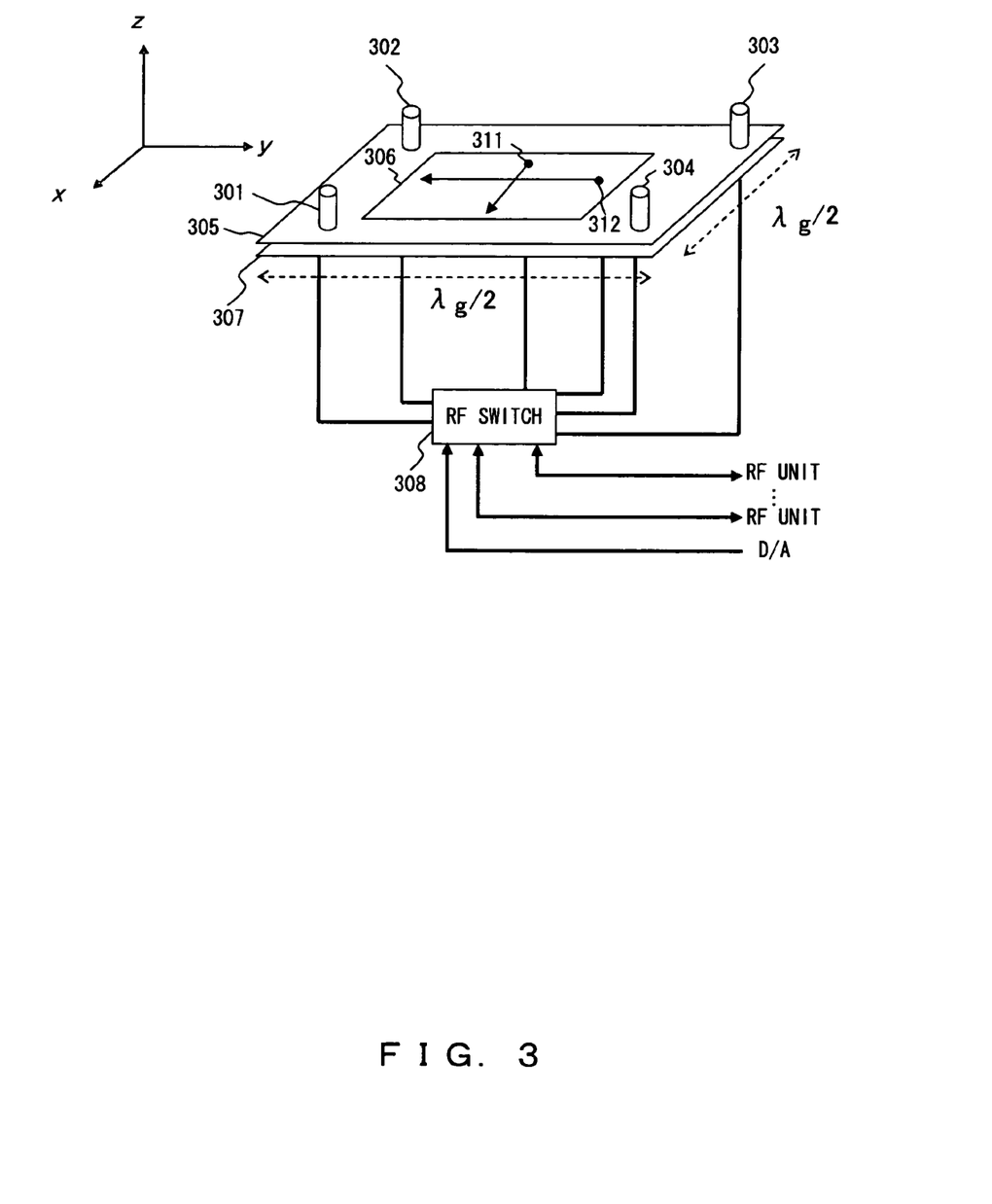
FIG. 3 shows a configuration of the first antenna apparatus.

FIG. 3 shows a configuration example of the antenna apparatus 201 as above. This antenna apparatus comprises four monopole antennas 301 through 304, a dielectric substrate 305, the radiation conductor 306, an earth conductor 307, and the RF switch 308.

When it is assumed that a wave length of a radio wave is $\lambda_g$, the shape of the dielectric substrate 305 is a square, the length of whose side is $\lambda_g/2$, for example. The monopole antennas 301 through 304 are arranged on four corners of this dielectric substrate 305 vertically with respect to the dielectric substrate 305. These monopole antennas 301 through 304 are the antennas corresponding to the z axis polarization, which is vertical with respect to the dielectric substrate 305 on the x-y plane.

The flat-type radiation conductor 306 is arranged at the center on the dielectric substrate 305, and comprises two feeding points 311 and 312. The feeding point 311 functions as the feeding point of the patch antenna corresponding to the x axis polarization, and the feeding point 312 functions as the feeding point of the patch antenna corresponding to the y axis polarization. Accordingly, the radiation conductor 306 serves as two patch antennas which respectively have the polarization characteristics being orthogonal to each other.

As above, the antenna apparatus of FIG. 3 comprises six antennas which are arranged such that the spatial fading correlation is low between each other. The RF switch 308 selects M number of antennas (M=2, 3, 4, 5, 6) from these antennas in accordance with the antenna selection signal from the D/A converter 205, and connects the selected antennas to the RF units 202-1 through 202-M. Then, the combination of antennas which is the most suitable for the communication state is selected.

For example, in a 2×2 MIMO communication, when a direction of an incoming radio wave is the null direction (the positive direction of the z axis) of a monopole antenna, the MIMO communication is conducted by selecting two patch antennas. In a 3×3 MIMO communication or 4×4 MIMO communication, one or two antennas in a good communication state are added from four remaining monopole antennas 301 through 304.

Figure 4:
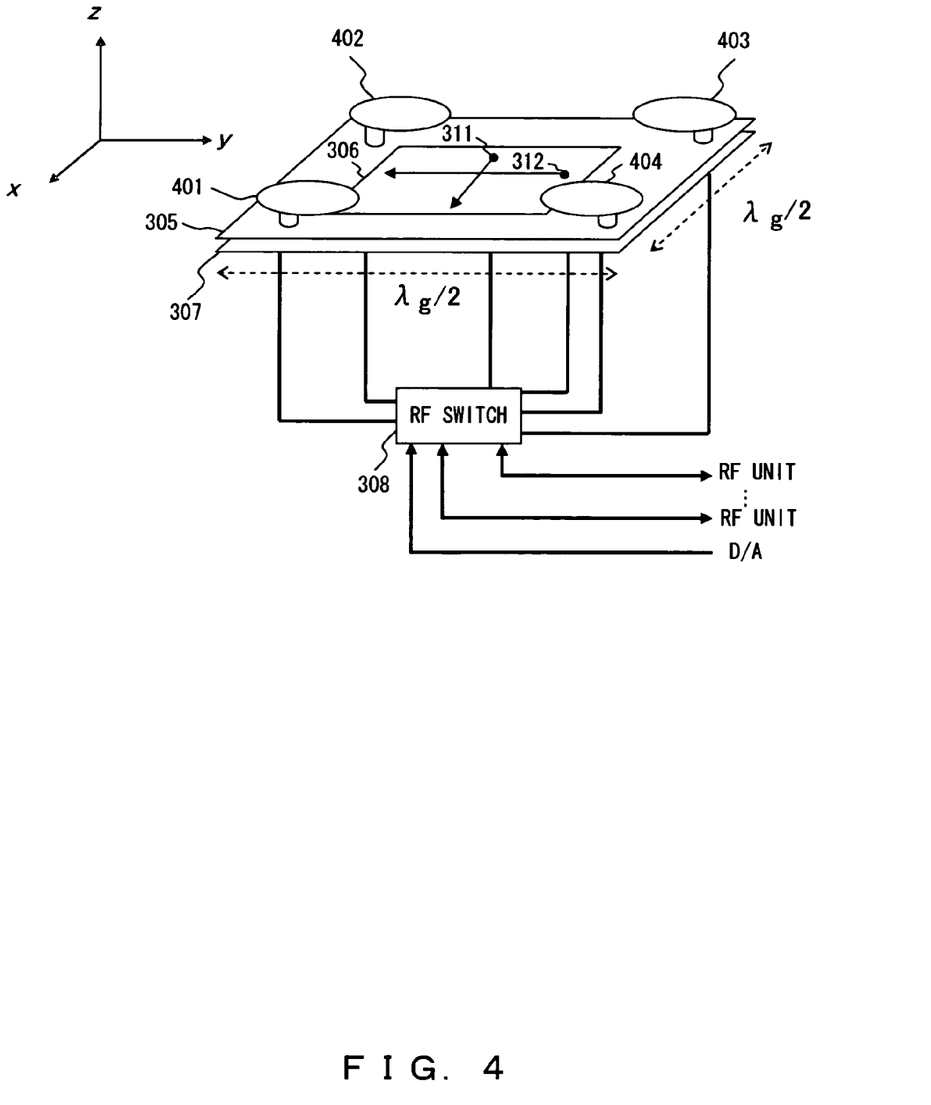
FIG. 4 shows a configuration of the second antenna apparatus.

FIG. 4 shows another configuration example of the antenna apparatus 201. The antenna apparatus has the configuration of the antenna apparatus of FIG. 3 in which the monopole antennas 301 through 304 are replaced by monopole antennas 401 through 404 which are of a capacity loaded type. The monopole antennas 401 through 404 are loaded with metal plates, and can be lower in height compared with the monopole antennas 301 through 304. In this case, in order to enhance isolation of the antennas, it is desirable that these metal plates do not overlap the radiation conductor 306 when being viewed from the upper side of the dielectric substrate 305.

In the configurations of FIG. 3 and of FIG. 4, four linear antennas and two micro strip antennas are included, however, the number of respective antennas can be arbitrarily selected, generally.

As described above, by the configuration that the RF switch 308 is provided in the antenna apparatus 201, and switching of antennas is conducted in the carrier frequency (high frequency) band, it is possible to reduce the number of the RF units 202-$m$ and of the A/D converters 203-$m$ to M. Accordingly, volume of hardware and the power consumption are reduced compared to the case that the switching of antennas is conducted in an intermediate frequency (IF) band or in a base band.

Next, methods are explained, for calculating a signal to interference plus noise ratio (SINR), the fading correlation between the antennas, a delay spread, and a condition number of propagation path matrix (channel matrix) used as the evaluation function for selecting the antennas.

First, it is assumed that the M number of received signals in the MIMO communication apparatus of FIG. 2 are given from y(t) of the equation below.

$$y(t) = \int_{-\infty}^{\infty} H(\tau)s(t-\tau)d\tau + \sum_{v=1}^{V}\int_{-\infty}^{\infty} G_v(\tau)u_v(t-\tau)d\tau + n(t) \in C^{M\times 1} \quad (2)$$

In the above equation, t and τ respectively represent a time and a delay time. Also, when it is assumed that a propagation path response from the n-th antenna (n=1, ..., N) in the MIMO communication apparatus (not shown) of the transmitting side to the m-th antenna (m=1, ..., M) in the MIMO communication apparatus of FIG. 2 is $h_{m,n}(\tau)$, the channel matrix H(τ) of the desired signal (transmitted signal), the desired signal s (t), and the noise n (t) are respectively defined by the equations (3), (4) and (5).

$$H(\tau) = \begin{bmatrix} h_{1,1}(\tau) & h_{1,2}(\tau) & \ldots & h_{1,N}(\tau) \\ h_{2,1}(\tau) & h_{2,2}(\tau) & \ldots & h_{2,N}(\tau) \\ \vdots & \vdots & \ddots & \vdots \\ h_{M,1}(\tau) & h_{M,2}(\tau) & \ldots & h_{M,N}(\tau) \end{bmatrix} \in C^{M\times N} \quad (3)$$

-continued $$s(t) = \begin{bmatrix} s_1(t) \\ s_2(t) \\ \vdots \\ s_N(t) \end{bmatrix} \in C^{N\times 1} \quad (4)$$

$$n(t) = \begin{bmatrix} n_1(t) \\ n_2(t) \\ \vdots \\ n_M(t) \end{bmatrix} \in C^{M\times 1} \quad (5)$$

$G_v(\tau)$ and $u_v(t)$ respectively represent the channel matrix and the transmitted signal of the v-th interfering station (v=1, ..., V), and V represents the maximum number of interfering stations.

(a) SINR

It is assumed that the result of estimation of H(τ) by using the known signal part of the received signals is $\hat{H}(\tau)$. Further, the m-th row of the matrix of the estimation result is expressed by the equation below.

$$\hat{H}_m(\tau) = [\hat{h}_{m,1}(\tau)\hat{h}_{m,2}(\tau)\ldots\hat{h}_{m,N}(\tau)] \quad (6)$$

In this case, the SINR in the m-th antenna is calculated by the equation below, using the equation (6).

$$SINR_m = \frac{E\left[\left|\int_{-\infty}^{\infty} \hat{H}_m(\tau)s_m(t-\tau)d\tau\right|^2\right]}{E\left[\left|y(t) - \int_{-\infty}^{\infty} \hat{H}_m(\tau)s_m(t-\tau)d\tau\right|^2\right]} \quad (7)$$

E[·] represents the expectation value operation. It is assumed that the estimation value is used as H(τ) in the calculation below.

(b) Fading Correlation

The fading correlation is obtained by conducting an averaging operation in which the spatial position is gradually shifted in the range that allows WSSUS (Wide-Sense Stationary Uncorrelated Scattering) in the case of the narrow-band communication. However, in the case of the wide-band communication, the fading correlation is the value close to the result of the averaging operation on the frequency axis. This is explained below.

When it is assumed that the Fourier transform pairs of the channel responses in the m1-th antenna and the m2-th antenna in the MIMO communication apparatus of FIG. 2 are respectively $h_{m_1,n}(f)$ and $h_{m_2,n}(f)$ the fading correlation is given by the equation below.

$$C_{m_1,m_2} = \frac{\sum_{n=1}^{N}\int_{f_{min}}^{f_{max}} h_{m_1,n}(f)(h_{m_2,n}(f))^* df}{\sum_{n=1}^{N}\int_{f_{min}}^{f_{max}} h_{m_1,n}(f)(h_{m_1,n}(f))^* df \sqrt{\sum_{n=1}^{N}\int_{f_{min}}^{f_{max}} h_{m_2,n}(f)(h_{m_2,n}(f))^* df}} \quad (8)$$

In the above equation, * represents complex conjugate, and $f_{max}$ and $f_{min}$ respectively represent the maximum value and the minimum value of the target frequency.

(c) Delay Spread

The delay spread is standard deviation of a delay profile expressing spread of the power distribution with respect to the delay time. The delay spread in the m-th antenna is given by the equation below.

$$\sigma_m = \sqrt{\frac{\sum_{n=1}^{N}\int_{-\infty}^{\infty} (\tau - \tau_{mean}^m)^2 h_{m,n}(\tau)d\tau}{P_m}} \quad (9)$$

$$\tau_{mean}^m = \frac{\sum_{n=1}^{N}\int_{-\infty}^{\infty} \tau h_{m,n}(\tau)d\tau}{P_m} \quad (10)$$

$$P_m = \sum_{n=1}^{N}\int_{-\infty}^{\infty} h_{m,n}(\tau)d\tau \quad (11)$$

(d) Condition Number

When it is assumed that the maximum value and the minimum value of the singular value of the matrix $H \in C^{M\times N}$ (N≦M) are respectively defined as $\lambda_{max}$ and $\lambda_{min}$, the condition number is given by the equation below.

$$\kappa = \frac{\lambda_{max}}{\lambda_{min}} (\geq 1) \qquad (12)$$

Next, specific examples of the evaluation function using the SINR, the fading correlation, the delay spread, and the condition number are explained. In these examples, the evaluation functions are expressed in the case that M number of antennas are selected in the antenna apparatus 201.

(A) SINR and Fading Correlation

Basically in the MIMO communication, the higher the SINR is, the better the characteristic is, and also, the lower the fading correlation is, the better the characteristic is. Accordingly, it is possible to improve the characteristic, for example, by selecting a combination of antennas such that the value of the evaluation function expressed by the formula below is large when the SINR and the fading correlation are used as selection references.

$$\frac{\sum_{m=1}^{M} SINR_m}{\prod_{m_1 < m_2} C_{m_1,m_2}} \qquad (13)$$

In the above formula, the multiplication symbol in the denominator represents the operation of multiplying fading correlation $C_{m1, m2}$ with respect to all the combinations (m1, m2=1, ..., M, m1<m2) in which the values of m1 and m2 are different.

(B) SINR and Delay Spread

Generally in the MIMO wireless communication system, a design is employed in which an encoding gain is obtained by using an error correction technique at the time of a frequency selective fading, accordingly, the greater the delay spread is, the better the characteristic is. In the case of OFDM (Orthogonal Frequency Division Multiplexing), delayed waves have to be within a guard interval. However, it is possible to attain the above effect by using an adaptive canceller.

When the SINR and the delay spread are used as the selection references, the combination of the antennas is to be selected such that the value of the evaluation function expressed by the formula below is large, for example.

$$\left(\sum_{m=1}^{M} SINR_m\right) \times \left(\sum_{m=1}^{M} \sigma_m\right) \qquad (14)$$

(C) Fading Correlation and Delay Spread

When the fading correlation and the delay spread are used as the selection references, the combination of the antennas is to be selected such that the value of the evaluation function expressed by the formula below is large, for example.

$$\frac{\sum_{m=1}^{M} \sigma_m}{\prod_{m_1 < m_2} C_{m_1,m_2}} \qquad (15)$$

(D) SINR, Fading Correlation, and Delay Spread

When the SINR, the fading correlation, and the delay spread are used as the selection references, the combination of the antennas is to be selected such that the value of the evaluation function expressed by the formula below is large, for example.

$$\frac{\left(\sum_{m=1}^{M} SINR_m\right) \times \left(\sum_{m=1}^{M} \sigma_m\right)}{\prod_{m_1 < m_2} C_{m_1,m_2}} \qquad (16)$$

(E) Condition Number

Generally in the MIMO wireless communication system, the smaller the condition number of the channel matrix is, the better the characteristic is, because the influence of the noise n(t) on the desired signal s(t) is suppressed. Accordingly, for example, by using as the evaluation function the condition number κ obtained from the H(τ) estimated by using the selected M number of antennas, the combination of the antennas is to be selected such that the value of the evaluation function is small.

Figure 5:
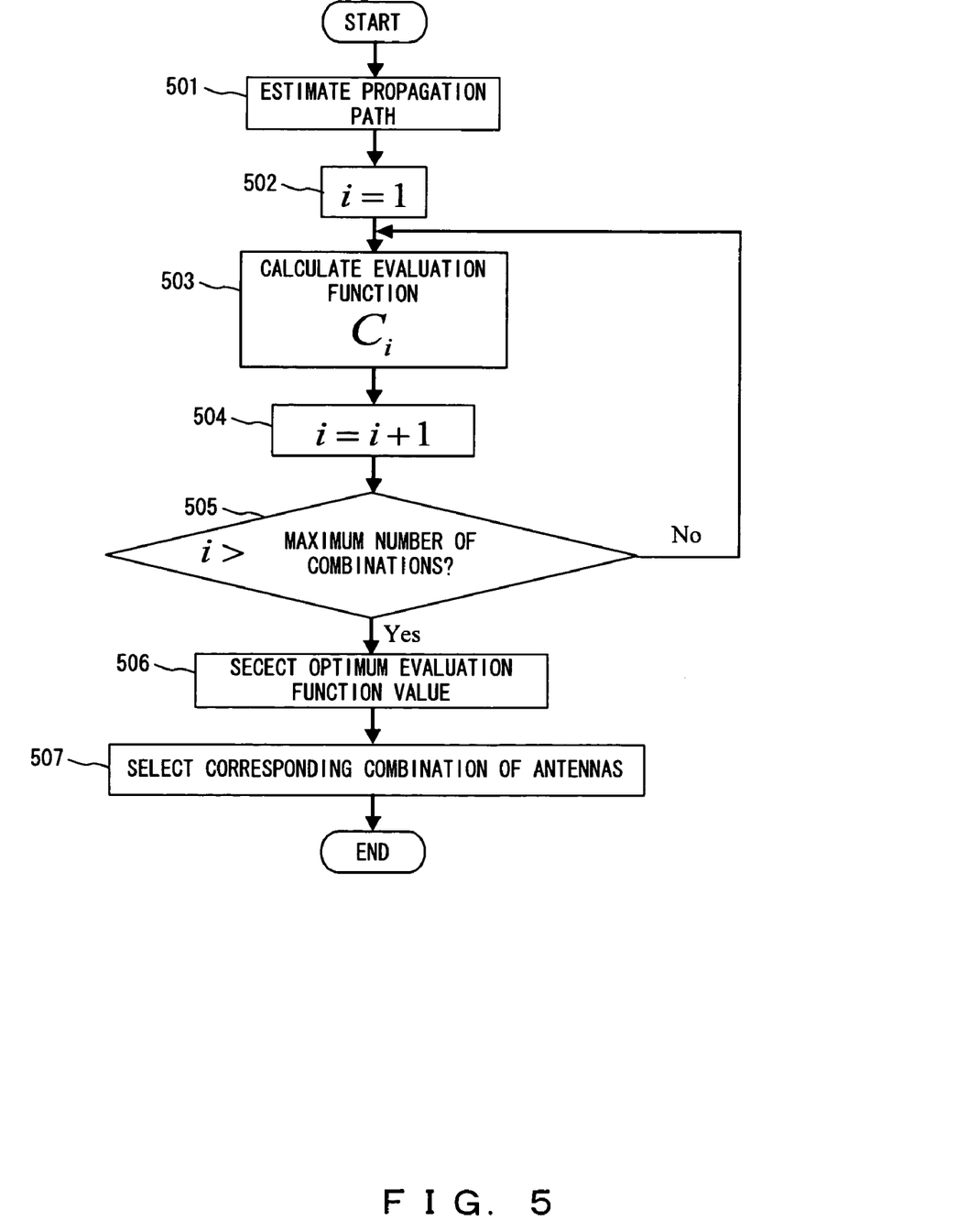
FIG. 5 is a flowchart of an antenna selection process.

FIG. 5 is a flowchart of an antenna selection process using such an evaluation function. The CPU 211 first estimates a propagation path by using known signals, and estimates the channel matrix H(τ) (step 501). Then, the channel matrix H(τ) is estimated for all the possible combinations of M number of antennas, respectively.

Next, a control variable i is set to 1 (step 502), and an evaluation function value $C_i$ is calculated by using a predetermined evaluation function for i-th combination of M number of antennas (step 503).

Next, 1 is added to i (step 504), and the addition result is compared with the maximum number of the combinations (step 505). If i is not larger than the maximum number of the combinations, the processes of step 503 and subsequent steps are repeated, and if i is larger than the maximum number of the combinations, the optimum value is selected from the calculated evaluation function values (step 506). For example, when one of the evaluation functions of the formulas (13) through (16) is used, the maximum value among the evaluation function values is the optimum value, and when the condition number κ is used as the evaluation function, the minimum value among the evaluation function values is the optimum value.

Then, the antenna selection signal causing the selection of the combination of antennas corresponding to the evaluation function value is output to the D/A converter 205 (step 507). Thereby, particular M number of antennas are selected in the antenna apparatus 201, and the selected antennas are connected to the RF units 202-1 through 202-M.

Additionally, the evaluation functions used for the antenna selection are not limited to the above functions of (A) through (E), and other evaluation functions can be employed, which use the SINR, the fading correlation, the delay spread, and the condition number.

What is claimed is:

1. An antenna apparatus for a multiple input multiple output communication, comprising:

a plurality of antennas which consist of at least two antennas having polarization characteristics or directivities different from one another; and a switch for selecting at least two antennas used for the multiple input multiple output communication from the plurality of antennas, wherein the switch selects the at least two antennas based on at least one selection reference of a delay spread and a condition number of a propagation path matrix.

2. The antenna apparatus for a multiple input multiple output communication according to claim 1, wherein:

the plurality of antennas include at least one micro strip antenna arranged on a substrate, and at least one linear antenna arranged vertically with respect to the substrate; and the micro strip antenna and the linear antenna have polarization characteristics or directivities different from one another.

3. The antenna apparatus for a multiple input multiple output communication according to claim 2, wherein:

the plurality of antennas include two micro strip antennas arranged on the substrate, and four linear antennas arranged vertically with respect to the substrate, and the switch selects two antennas from the two micro strip antennas and the four linear antennas when two antennas are used for the multiple input multiple output communication.

4. The antenna apparatus for a multiple input multiple output communication according to claim 2, wherein:

the plurality of antennas include two micro strip antennas arranged on the substrate, and four linear antennas arranged vertically with respect to the substrate, and the switch selects three antennas from the two micro strip antennas and the four linear antennas when three antennas are used for the multiple input multiple output communication.

5. The antenna apparatus for a multiple input multiple output communication according to claim 2, wherein:

the plurality of antennas include two micro strip antennas arranged on the substrate, and four linear antennas arranged vertically with respect to the substrate, and the switch selects four antennas from the two micro strip antennas and the four linear antennas when four antennas are used for the multiple input multiple output communication.

6. The antenna apparatus for a multiple input multiple output communication according to claim 2, wherein the linear antenna is loaded with a metal plate.

7. The antenna apparatus for a multiple input multiple output communication according to claim 1, wherein the switch selects the at least two antennas in a carrier frequency band.

8. The antenna apparatus for a multiple input multiple output communication according to claim 1, wherein the switch selects the at least two antennas such that a value of an evaluation function of at least one selection reference of the delay spread and the condition number of the propagation path matrix satisfies a prescribed condition.

9. The antenna apparatus for a multiple input multiple output communication according to claim 1, wherein the switch selects the at least two antennas so as to satisfy at least one condition of a larger delay spread and a smaller condition number of the propagation path matrix.

10. A multiple input multiple output communication method, comprising:

selecting at least two antennas from a plurality of antennas which include at least two antennas having polarization characteristics or directivities different from one another; and conducting the multiple input multiple output communication by using the selected antennas, wherein the selecting selects the at least two antennas based on at least one selection reference of a delay spread and a condition number of a propagation path matrix.

11. An antenna apparatus for a multiple input multiple output communication, comprising:

a plurality of antenna means which include at least two antenna means having polarization characteristics or directivities different from one another; and switch means for selecting at least two antenna means used for the multiple input multiple output communication from the plurality of antenna means, wherein the switch means selects the at least two antenna means based on at least one selection reference of a delay spread and a condition number of a propagation path matrix.

* * * * *